United States Patent [19]

Brokaw

[11] Patent Number: 5,394,078
[45] Date of Patent: Feb. 28, 1995

[54] TWO TERMINAL TEMPERATURE TRANSDUCER HAVING CIRCUITRY WHICH CONTROLS THE ENTIRE OPERATING CURRENT TO BE LINEARLY PROPORTIONAL WITH TEMPERATURE

[75] Inventor: A. Paul Brokaw, Burlington, Mass.

[73] Assignee: Analog Devices, Inc., Norwood, Mass.

[21] Appl. No.: 142,768

[22] Filed: Oct. 26, 1993

[51] Int. Cl.[6] ............................................. G05F 3/30
[52] U.S. Cl. .................................. 323/313; 323/314; 323/907
[58] Field of Search ............... 323/312, 313, 314, 315, 323/907, 311

[56] References Cited

U.S. PATENT DOCUMENTS

| | | | |
|---|---|---|---|
| 3,940,760 | 2/1976 | Brokaw | 340/347 |
| 4,071,813 | 1/1978 | Dobkin | 323/313 X |
| 4,123,698 | 10/1978 | Timko et al. | 323/312 |
| 4,176,308 | 11/1979 | Dobkin et al. | 323/314 |
| 4,497,586 | 2/1985 | Nelson | 374/163 |

OTHER PUBLICATIONS

Brokaw, A. Paul, "A Monolithic Conditioner for Thermocouple Signals", *IEEE Journal of Solid-State Circuits*, vol. SC-18, No. 6, Dec. 1983, pp. 707–716.

Timko, Michael P., "A Two-Terminal IC Temperature Transducer", *IEEE Journal of Solid-State Circuits*, vol. SC-11, No. 6, Dec. 1976, pp. 784–788.

Primary Examiner—Steven L. Stephan
Assistant Examiner—Y. Jessica Han
Attorney, Agent, or Firm—Samuels, Gauthier & Stevens

[57] ABSTRACT

A two terminal temperature transducer which controls its operating current to indicate the temperature, by producing a linear response to temperature which can be set to extrapolate to a desired temperature. The transducer including circuitry which controls its operating current to be linearly proportional with temperature. The circuitry operates to produce a first reference voltage which is proportional to absolute temperature, produce a second reference voltage which is complementary to absolute temperature, generate a voltage drop corresponding to the operating current, compare the voltage drop to a temperature sensitive voltage corresponding to the difference between the first reference voltage and the second reference voltage, and adjust the operating current so as to equilibrate the voltage drop and the temperature sensitive voltage. According to one embodiment, the transducer includes an amplifier with a proportional to absolute temperature input offset voltage to drive a temperature proportional current through a series resistor, and includes circuitry to offset one input of the amplifier so as to cause the extrapolated slope of the temperature proportional current to pass through zero at a selected temperature.

21 Claims, 4 Drawing Sheets

TWO TERMINAL TEMPERATURE TRANSDUCER HAVING CIRCUITRY WHICH CONTROLS THE ENTIRE OPERATING CURRENT TO BE LINEARLY PROPORTIONAL WITH TEMPERATURE

BACKGROUND OF THE INVENTION

The invention relates to temperature sensing devices, and more particularly to such devices using the temperature sensitive properties of transistors.

A variety of temperature measuring devices are well known in the art. Standard devices, such as thermocouples, thermistors, or RTDs, all have limitations which prevent them from being easily or widely utilized. Thermocouples require accurate cold junction compensation, some form of linearization, and produce a low level voltage output which is subject to electrical noise interference. Resistance thermometers and thermistors have a non-linear characteristic which requires careful compensation and a wide dynamic electrical range. In addition, making a good resistance measurement demands an accurate voltage source, low level precision current sensing, and careful lead compensation. These devices also require strict attention to lead wire material connections. Initial calibration on all of these devices is also a problem, especially when field replacement is necessary.

Conventional integrated circuit temperature transducers are based upon the capability of a transistor to generate a base-to-emitter difference voltage ($\Delta V_{be}$) proportional to absolute temperature, accurate over a wide temperature range. Previous attempts to use this property have employed means for amplifying and buffering the voltage signal and providing necessary support circuitry, such as a voltage regulator, on the same integrated circuit chip.

One particular approach to using the linear $\Delta V_{be}$ versus temperature property of a transistor to form a temperature sensing device is described in U.S. Pat. No. 3,940,760 to Brokaw and U.S. Pat. No. 4,123,698 to Timko et al. A two terminal temperature transducer 10 illustrated in FIG. 1 generates an output current $I_T$ varying with absolute temperature by means of first and second transistors Q1 and Q2 operated at a constant ratio of emitter current densities, and having their bases interconnected and the difference between their respective $V_{be}$ impressed across a resistor R. In the transistors Q1 and Q2, the equation for emitter current density is:

$$J_e = J_s(e^{q\frac{V_{be}}{KT}} - 1) \quad (1)$$

where $J_s$ is the emitter saturation current density, q is the charge in coulombs of an electron, K is Boltzman's constant, and T is absolute temperature. In practice, the (−1) term is very small and is usually neglected.

For two transistors at current densities $J_{e1}$ and $J_{e2}$, the respective base-to-emitter voltages are:

$$V_{be1} = \left(\frac{KT}{q}\right)\ln\frac{J_{e1}}{J_s} \quad (2)$$

$$V_{be2} = \left(\frac{KT}{q}\right)\ln\frac{J_{e2}}{J_s} \quad (3)$$

The difference between the base-to-emitter voltages is then given by:

$$\Delta V_{be} = V_{be1} - V_{be2} = \left(\frac{KT}{q}\right)\ln\frac{J_{e1}}{J_{e2}} \quad (4)$$

For $\Delta V_{be}$ to be proportional to absolute temperature, the logarithmic term must be constant. Thus, if $J_{e1}/J_{e2}$ is a constant r, not equal to 1, then $$\Delta V_{be} = T\left(\frac{K}{q}\ln r\right) \quad (5)$$

In the transducer 10 of FIG. 1, a constant ratio of emitter current densities is achieved by providing the first and second transistors Q1 and Q2 with emitter conductive areas of different sizes, and by using additional transistors Q3 and Q4 connected to the collectors of the transistors Q1 and Q2, together with diode connections across transistors Q2 and Q3, in order to supply currents through the transistors Q1 and Q2. Assuming that the transistor collector currents are dependent only on $V_{be}$, and neglecting base currents, then equal currents $I_{c1} = I_{c2}$ are forced through transistors Q1 and Q2. Assuming the emitter conductive areas of transistors Q1 and Q2 are in a ratio r, the ratio of emitter current densities also will be r, and the difference voltage $\Delta V_{be}$ is directly proportional to absolute temperature. The voltage $\Delta V_{be}$ appears across resistor R and determines the level of current flowing through transistor Q1. The output current $I_T$ drawn by both sides of the circuit is $$I_T = 2\frac{\Delta V_{be}}{R} = \left(2\frac{K\ln r}{q}\right)\frac{T}{R} \quad (6)$$

If the resistor R has a zero temperature coefficient, then $I_T$ is also directly proportional to absolute temperature, and appropriate selection of the emitter ratio r and resistance R will provide an output current accurately related to temperature with a predetermined constant of proportionality, useful for absolute temperature sensing purposes.

Unfortunately, while the above described transducer provides an output current which is proportional to absolute temperature, in practice the device is generally specified only for operation to −55° C. or 218° K. and is useful at somewhat lower temperatures. In order to measure a small temperature range using the transducer 10, it is necessary to suppress at least the first 218° K. worth of its output signal, or more typically, the first 273° K. in order to refer a conditioned output signal to 0° C. This suppression is an inconvenience and a possible source of error with a degradation of signal-to-noise ratio. The zero suppression involves an additional reference signal which must be temperature insensitive, and any error in this reference reflects as an error in the conditioned output.

Accordingly, it is desirable to provide a two terminal temperature transducer which has a zero output occurring closer to its normal operating temperature range. Such an arrangement permits the transducer to operate with greater sensitivity since the effect of self heating by the operating current is smaller.

It is therefore an object of the present invention to provide an integrated circuit two terminal temperature transducer which measures temperature and indicates its output by modulating its operating current linearly proportional to temperature referred to some zero value above 0° K. and close to its intended range of operation.

SUMMARY OF THE INVENTION

The principle of operation of the present invention is to pass the operating current of a circuit through a single resistor, to compare the resulting voltage drop to a temperature sensitive voltage, and to adjust the total operating current so that the resistor voltage matches the temperature sensitive voltage. The temperature sensitive voltage is made to be proportional to temperature and to pass through zero at the extrapolated zero point desired for the transducer.

Accordingly, the present invention provides a two terminal temperature transducer including circuitry which controls its operating current to be linearly proportional with temperature. The circuitry of the transducer includes means for producing a first reference voltage which is proportional to absolute temperature; means for producing a second reference voltage which is complementary to absolute temperatures; means for generating a voltage drop corresponding to the operating current; means for comparing the voltage drop to a temperature sensitive voltage corresponding to the difference between the first reference voltage and the second reference voltage; and means for adjusting the operating current so as to equilibrate the voltage drop and the temperature sensitive voltage.

According to an alternate embodiment of the present invention, there is provided a two terminal temperature transducer including circuitry which produces an output current that varies linearly with temperature. The circuitry includes a differential input stage including first and second transistors having differing operational current densities, and current supplying means for supplying current through the first and second transistors to operate the first and second transistors at different current densities and to produce a difference between the respective base-to-emitter voltages, the difference in base-to-emitter voltages corresponding to a first reference voltage which is proportional to absolute temperature. A third transistor is provided having a base-to-emitter voltage corresponding to a second reference voltage which is complementary to absolute temperature, the third transistor being coupled to the differential input stage so that a portion of the base-to-emitter voltage of the third transistor equals the difference in base-to-emitter voltages of the first and second transistors at a predetermined temperature. Converting means are provided for converting the difference between the first reference voltage and the second reference voltage into the output current.

DETAILED DESCRIPTION OF THE ILLUSTRATED EMBODIMENTS

Figure 2:
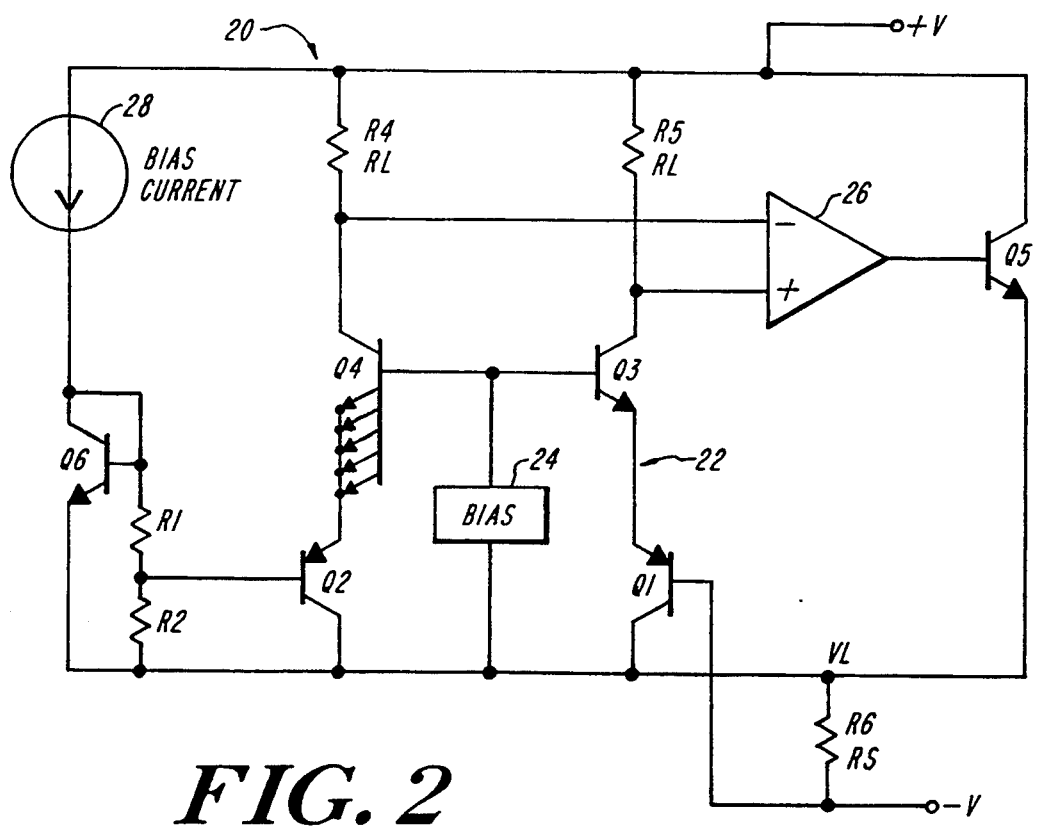
FIG. 2 shows an exemplary embodiment of a two terminal temperature transducer in accordance with the present invention.

With reference to FIG. 2, an exemplary embodiment of a two terminal temperature transducer 20 in accordance with the present invention is shown. The transducer of the present invention operates in accordance with the temperature effects on the base-to-emitter voltage of a transistor and the difference between that voltage and the base-to-emitter voltage of a matched transistor. For example, when two matched transistors are operated at different current densities, their base-to-emitter voltages differ by an amount proportional to absolute temperature (PTAT). This voltage is given by equation (4) provided above.

In turn, the base-to-emitter voltage of a transistor is dependably temperature sensitive as it falls to zero at a temperature related to how the transistor is made and the collector current of the device. If this decline is extrapolated to low temperatures, however, the voltage at zero (absolute) will be nearly independent of how the transistor is made, as long as the collector current function used has zero as its limit at zero and is positive for all other positive transistor temperatures. In other words, the temperature behavior of the base-to-emitter voltage around room temperature can be extrapolated toward a single value at zero. If the collector current is made to be PTAT, the voltage intercept at zero will be almost independent of how the transistor is made or of the actual room temperature bias current. The intercept approximates the extrapolated band gap voltage. This extrapolated voltage is the complement of a PTAT voltage with respect to the intercept value of the band gap voltage or is complementary to absolute temperature (CTAT).

Figure 3:
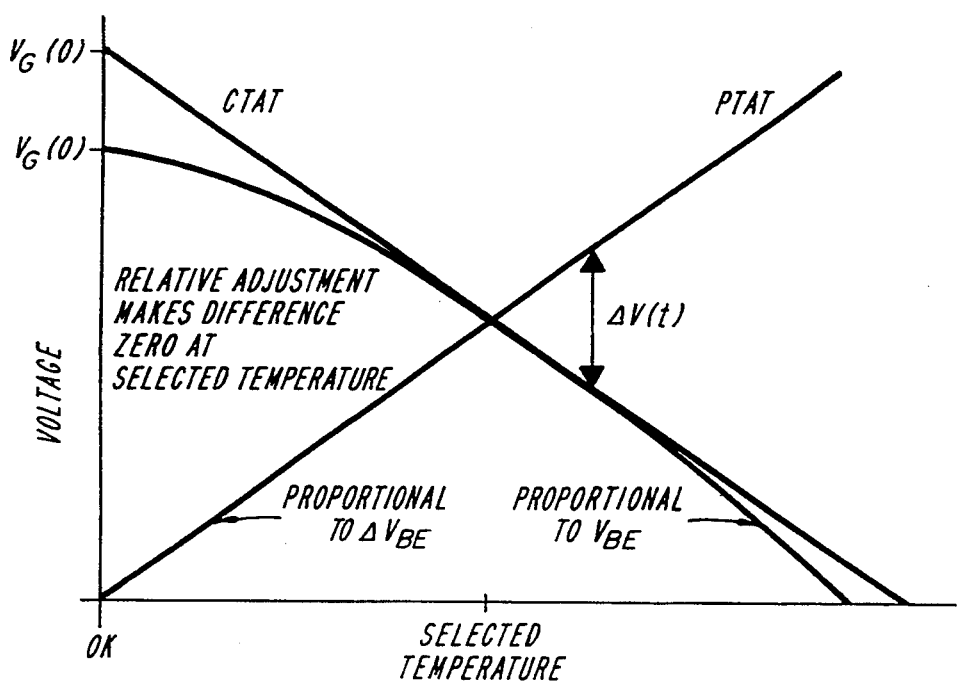
FIG. 3 shows a plot of the difference of a PTAT and a CTAT voltage.

With reference now to FIG. 3, a plot of a voltage scaled from the idealized base-to-emitter voltage and a CTAT voltage tangent to it is shown. The plot also includes a PTAT voltage proportional to the $\Delta V_{be}$ of transistors operated at different current densities. These voltages are assumed to have been adjusted relative to one another, so that they are at a selected temperature, thus making their difference zero. The PTAT and CTAT voltages so adjusted now produce a difference voltage above the selected temperature.

Figure 4:
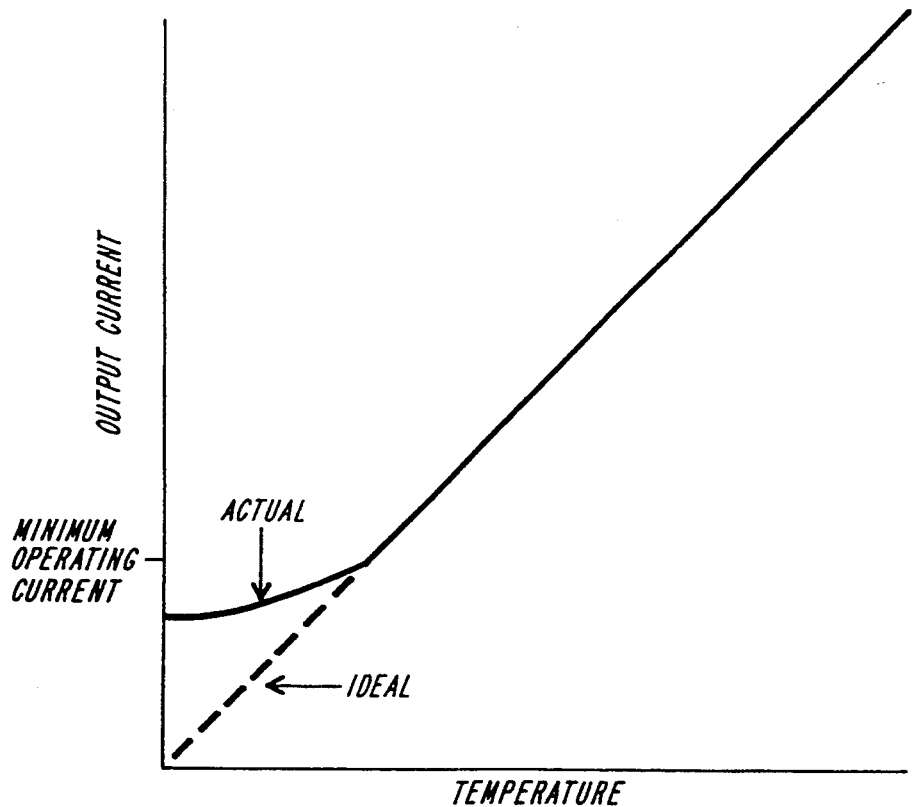
FIG. 4 shows an I-V curve of the device in FIG. 2 as the device sink current departs from ideal at low temperatures.

With reference back to FIG. 2, since the control portions of the transducer 20 will require some minimum current to operate, the current in the circuit cannot be made to pass through zero. Therefore, the extrapolated zero must be set somewhat below the actual operating range. For example, the circuit may have an extrapolated zero point of −70° C. and be intended to operate in the range above −55° C. with a scale of 5 $\mu A/°C$. Accordingly, a minimum of 75 $\mu A$ ((70°−55°)×5 $\mu A/°C$) is available to operate the circuit. When the temperature is above the value corresponding to the keep-alive current, the circuit operates as a current sink loading its supply terminals to the proper load current. FIG. 4 shows an I-V curve illustrating how the actual device sink current might depart from ideal at low temperatures.

The transducer 20 includes a differential input stage 22 having transistors Q1, Q2, Q3, and Q4 arranged so that the inputs can go slightly negative with respect to the remainder of the transducer circuitry, and the differential output current is drawn from the positive direction by transistors Q3 and Q4. The differential input stage includes a bias current supply 24 coupled between the bases of Q3 and Q4 and the collectors of Q1 and Q2.

The output currents of Q3 and Q4 develop a voltage across the two load resistors R4 and R5 coupled thereto. Any difference in the currents will result in a difference voltage at the ends of the load resistors which drives the inputs of an op-amp 26. Any difference voltage derived by the load resistors will cause the amplifier to drive a transistor Q5 to increase or decrease the current supply to a reference node VL. Coupled to the node VL is a resistor R6 which functions as the sensing resistor placed in series with the entire circuitry of the transducer 20, except for the base current of transistor Q1, which may be made small and relatively repeatable. Thus, as the amplifier 26 drives transistor Q5, the current through the resistor R6 is increased or decreased accordingly. The connections of the circuitry are phased so that the resulting change in voltage across resistor R6 tends to reduce the difference in the collector currents of transistors Q3 and Q4. Accordingly, the operating point of the transducer 20 will move toward an equilibrium which equalizes the collector currents of transistors Q3 and Q4.

As shown, transistor Q4 is configured with multiple emitters so that it will be operating at reduced current density when its collector current matches that of transistor Q3. As a consequence, the base-to-emitter voltages of the transistors Q3 and Q4 will differ by the amount $\Delta V_{be}$ as described in equation (4). For example, with transistor Q4 having four emitters, the differences between the base-to-emitter voltages becomes $$\Delta V_{be} = \left(\frac{KT}{q}\right)\ln 4 \qquad (7)$$

which is equivalent to approximately 36 mV at room temperature. It will be appreciated by those of skill in the art that the reduced current density of transistor Q4 may also be achieved by configuring either both transistor Q4 and transistor Q2 or only Q2 with multiple emitters.

Figure 1:
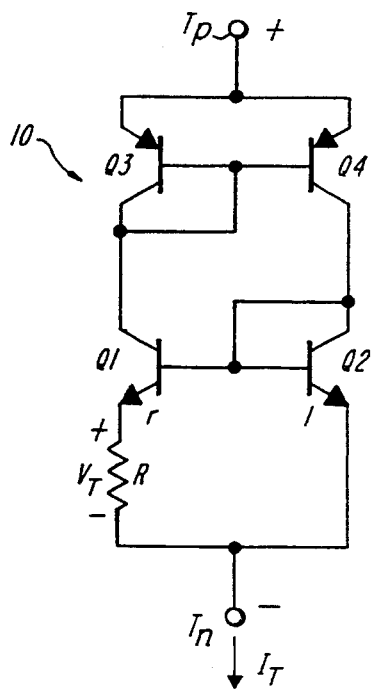
FIG. 1 is a schematic diagram of a prior art two terminal temperature transducer.

This voltage will be proportional to T, the Kelvin temperature, so long as the collector currents are held in balance. If the circuit loop of the transducer 20 operated to force this voltage across the resistor R6, the output current would be PTAT, similar to that of the transducer 10 shown in FIG. 1. However, the base of transistor Q2 is coupled to a fraction of the base-to-emitter voltage of a transistor Q6. The transistor Q6 along with a bias current source 28 is configured in parallel to the input differential stage 22. The transistor Q6 includes a voltage divider made up of resistors R1 and R2 disposed across the base and emitter of the transistor Q6. The portion of the base-to-emitter voltage of the transistor Q6 appearing across resistor R2 will be CTAT, as it falls with increasing temperature.

By properly choosing the fraction of the base-to-emitter voltage of the transistor Q6 with predetermined values for the resistors R1 and R2, this voltage may be selected to equal $\Delta V_{be}$ of the transistors Q3 and Q4 at a predetermined temperature. At this predetermined temperature, the circuit loop would be in balance with zero volts across the resistor R6, since the base of the transistor Q2 will be $\Delta V_{be}$ above the voltage at the node VL. At higher temperatures, the voltage applied to the base of the transistor Q2 will fall, while the $\Delta V_{be}$ required for balance will rise. As a result, the circuit loop will force a temperature proportional current to flow in the resistor R6. Accordingly, the transducer 20 will operate to closely approximate the temperature proportional characteristic desired, at temperatures which correspond to currents larger than the operating minimum.

Figure 5:
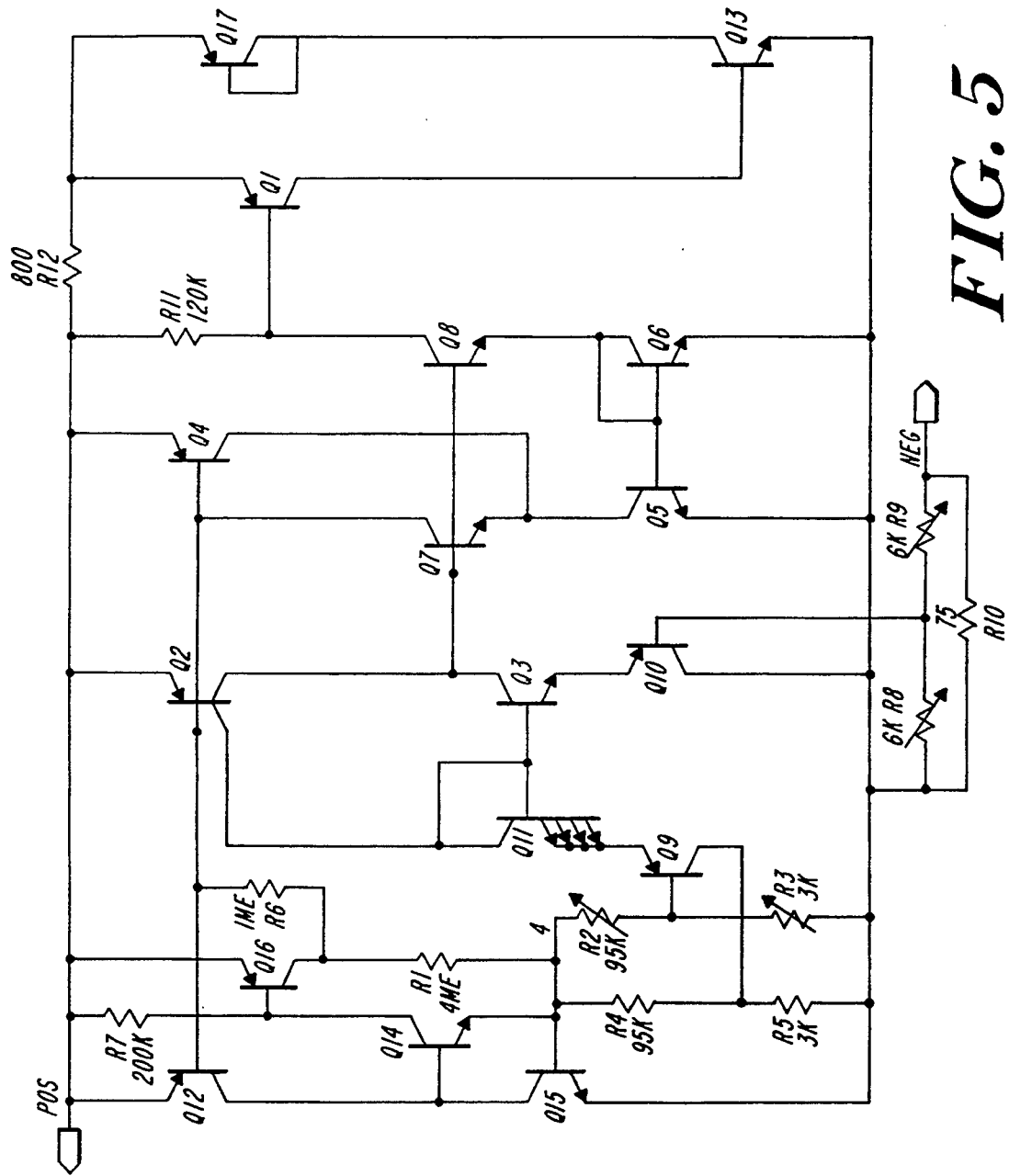
FIG. 5 shows a detailed schematic of the two terminal temperature transducer of FIG. 2.
Figure 6A:
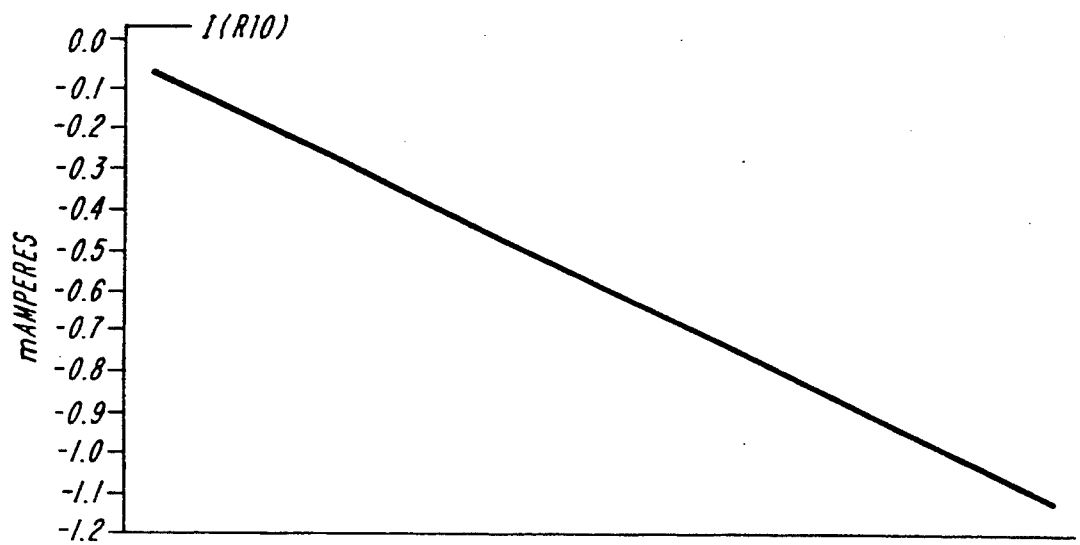
FIGS. 6A and 6B show plots of a simulated temperature sweep of the circuit of FIG. 5.
Figure 6B:
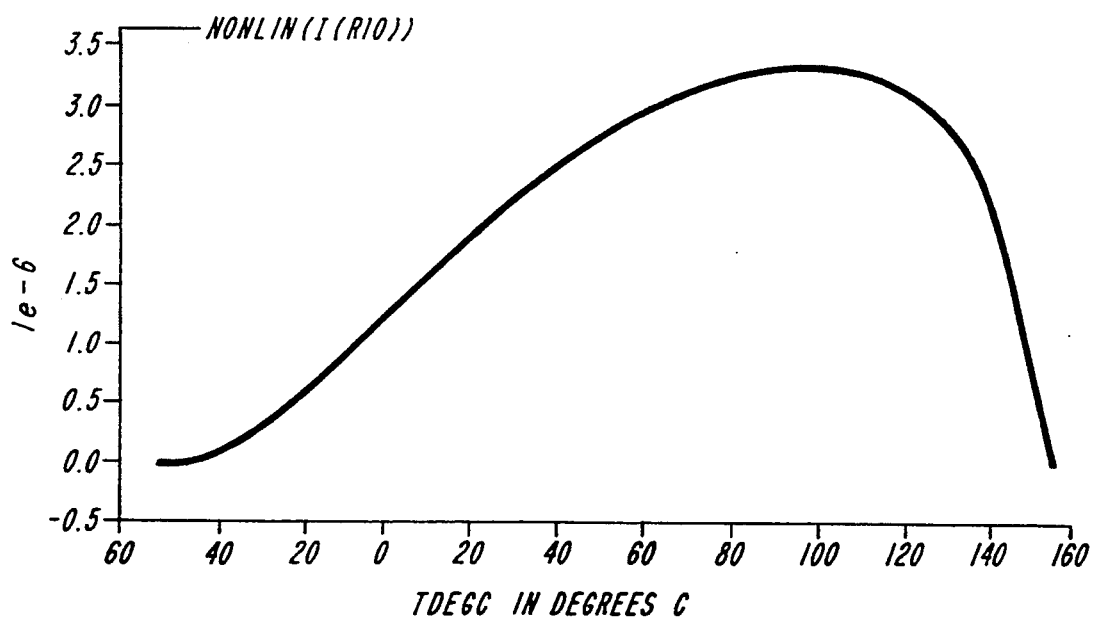

With reference now to FIG. 5, a more detailed schematic of the two terminal temperature transducer 20 of FIG. 2 is shown. FIGS. 6A and 6B show plots of a simulated temperature sweep of the circuit in FIG. 5, from $-55°$ C. to $155°$ C. showing the current drawn as a function of temperature, and the non-linearity of the response. The circuit has been configured to have a slope of about 5 $\mu A/°C$. and an intercept of $-70°$ C.

It will be appreciated by those of skill in the art that alternate embodiments of the two terminal temperature transducers shown in FIGS. 2 and 5 are possible. For example, as shown in FIGS. 2 and 5, the transducers utilize NPN transistors to form the $\Delta V_{be}$, since the NPN transistors found in common processes are superior for these purposes. As an alternative embodiment, it is possible to reverse the position of the multiple emitters to the input transistor pair, rather than the level shift transistors if appropriate PNP transistors are available. Furthermore, the sensing resistor R6 may be placed in the positive lead of the transducer and measured relatively easily. By inverting the input circuitry utilizing NPN transistors as the input and PNP transistors as level shifters, the transducer could compare the resistor R6 voltage to a fraction of a $V_{be}$ connected to the positive lead.

A further modification to the transducer of FIG. 2 is the implementation of curvature correction. The $V_{be}$ of transistor Q6 falls approximately in proportion to temperature, however, there is a small component of higher order temperature sensitivity causing the voltage to curve slightly. This curvature can be corrected in the transducer of the present invention, as is done in bandgap references. For example, a small resistance having a positive temperature coefficient can be added in series with the resistor R6 to produce a slight curvature in the overall VI characteristic over temperature. This can be adjusted to reduce the curvature resulting from the $V_{be}$ of transistor Q6. Alternatively, temperature sensitive resistors can be used in the transistor Q6 voltage divider to compensate for the curvature.

Additional features which may be included in the transducer of the present invention include additional resistances similar to resistor R6 which are provided as connection options to program the sensitivity. The voltage divider associated with transistor Q6 may also have pin selectable taps, to permit user selection of the zero point.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A two terminal temperature transducer including circuitry which controls its entire operating current to be linearly proportional with temperature, said circuitry comprising:
   means for producing a first reference voltage which is proportional to absolute temperature;
   means for producing a second reference voltage which is complementary to absolute temperature;
   means for generating a voltage drop corresponding to said entire operating current flowing through the two terminals;
   means for comparing said voltage drop to a temperature sensitive voltage corresponding to the difference between said first reference voltage and said second reference voltage; and
   means for adjusting said entire operating current so as to equilibrate said voltage drop and said temperature sensitive voltage.

2. The transducer of claim 1, wherein said means for producing said first reference voltage comprises first and second transistors which produce a difference between the respective base-to-emitter voltages corresponding to said first reference voltage.

3. The transducer of claim 2, wherein said first transistor operates at a different current density than said second transistor for matching collector currents.

4. The transducer of claim 2, wherein said first transistor is electrically coupled to said means for producing said second reference voltage.

5. The transducer of claim 4, wherein said means for producing said second reference voltage comprises a third transistor having an associated base-to-emitter voltage, said second reference voltage corresponding to a predetermined portion of the base-to-emitter voltage of said third transistor.

6. The transducer of claim 5, wherein a zero output for said transducer is produced in response to the difference between the respective base-to-emitter voltages of said first and second transistors being equal to said predetermined portion of the base-to-emitter voltage of said third transistor.

7. The transducer of claim 1, wherein said means for generating a voltage drop produces a voltage drop of zero in response to said first and second reference voltages being equal.

8. The transducer of claim 7, wherein said zero voltage drop corresponds to a reference zero temperature.

9. The transducer of claim 1, wherein said means for generating a voltage drop comprises a resistor coupled in series with both said means for producing said first reference voltage and said means for producing said second reference voltage.

10. A two terminal temperature transducer including circuitry which produces an output which is the entire operating current that varies linearly with temperature, said circuitry comprising:
    a differential input stage including first and second transistors having differing operational current densities;
    current supplying means for supplying current through said first and second transistors to operate said first and second transistors at different current densities and to produce a difference between the respective base-to-emitter voltages, said difference in base-to-emitter voltages corresponding to a first reference voltage which is proportional to absolute temperature;
    a third transistor having a base-to-emitter voltage corresponding to a second reference voltage which is complementary to absolute temperature, said third transistor being coupled to said differential input stage so that a portion of said base to emitter voltage of said third transistor equals said difference in base to emitter voltages of said first and second transistors at a predetermined temperature;
    converting means for converting the difference between said first reference voltage and said second reference voltage into said entire operating current which is provided to the two terminals as said output.

11. The transducer of claim 10, wherein an extrapolated zero output for said transducer is produced in response to said difference in base-to-emitter voltages of said first and second transistors being equal to said predetermined portion of the base-to-emitter voltage of said third transistor at said predetermined temperature.

12. The transducer of claim 11, wherein said extrapolated zero output corresponds to a zero reference temperature.

13. The transducer of claim 11, wherein said first transistor comprises a plurality of emitters in order to operate at a different current density than said second transistor.

14. The transducer of claim 11, wherein said third transistor is coupled to said first transistor through a fourth transistor.

15. The transducer of claim 14, wherein said fourth transistor comprises a plurality of emitters in order to operate said first transistor at a different current density than said second transistor.

16. The transducer of claim 10, wherein a temperature proportional current is provided to said converting means in response to a variation in temperature.

17. The transducer of claim 10 further comprising correcting means for correcting temperature sensitive variations of the base-to-emitter voltage of said third transistor.

18. The transducer of claim 17, wherein said correcting means comprises a resistance having a positive temperature coefficient disposed in series with said converting means.

19. The transducer of claim 10, wherein said first transistor is coupled to a voltage divider associated with the base and emitter of said third transistor.

20. The transducer of claim 19, wherein said voltage divider comprises pin selectable taps.

21. A method of controlling the entire operating current of a two terminal temperature transducer to be linearly proportional with temperature, said method comprising the steps of:
    producing a first reference voltage which is proportional to absolute temperature;
    producing a second reference voltage which is complementary to absolute temperature;
    generating a voltage drop corresponding to said entire operating current flowing through the two terminals;
    comparing said voltage drop to a temperature sensitive voltage corresponding to the difference between said first reference voltage and said second reference voltage; and
    adjusting said entire operating current so as to equilibrate said voltage drop and said temperature sensitive voltage.

* * * * *